US008097853B2

(12) United States Patent
Ji et al.

(10) Patent No.: US 8,097,853 B2
(45) Date of Patent: Jan. 17, 2012

(54) INFRARED PHOTOCURRENT FRONT-END ADC FOR RAIN-SENSING SYSTEM WITH AMBIENT LIGHT COMPENSATION

(75) Inventors: Cang Ji, Kirchheim/Teck-Nabern (DE); Julian Tyrrell, Swindon (GB)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 258 days.

(21) Appl. No.: 12/592,259

(22) Filed: Nov. 20, 2009

(65) Prior Publication Data

US 2011/0114842 A1    May 19, 2011

(30) Foreign Application Priority Data

Nov. 17, 2009   (EP) .................................... 09368043

(51) Int. Cl.
G01J 5/02        (2006.01)
(52) U.S. Cl. ..................................................... 250/340
(58) Field of Classification Search .......... 250/330–335, 250/336.1–336.2, 338.1–338.5, 340, 341.1–341.8
See application file for complete search history.

(56) References Cited

U.S. PATENT DOCUMENTS

| | | | |
|---|---|---|---|
| 5,929,982 A | 7/1999 | Anderson | |
| 6,329,923 B2 | 12/2001 | Hog | |
| 6,331,819 B1 | 12/2001 | Hog | |
| 7,019,321 B2 | 3/2006 | Kokuryo et al. | |
| 7,868,294 B2 * | 1/2011 | Holcombe et al. | ......... 250/338.1 |
| 2004/0056199 A1 | 3/2004 | O'Connor et al. | |
| 2009/0121889 A1 | 5/2009 | Lin et al. | |

FOREIGN PATENT DOCUMENTS

| | | |
|---|---|---|
| DE | 10214421 | 10/2003 |
| DE | 102007034606 | 1/2009 |
| WO | WO 00/41023 | 7/2000 |
| WO | WO 2009/049959 | 4/2009 |

OTHER PUBLICATIONS

European Search Report, 10368019.5-2415, Mail date—Mar. 8, 2011, Dialog Semiconductor, GmbH.

"High quantum efficiency annular backside silicon photodiodes for reflectance pulse oximetry in wearable wireless body sensors," by Sune Duun et al., Journal of Micromechanics and Microengineering 20 (2010) 075020 (15pp).

* cited by examiner

Primary Examiner — Kiho Kim
(74) Attorney, Agent, or Firm — Saile Ackerman LLC; Stephen B. Ackerman

(57) ABSTRACT

Systems and methods for a front-end circuit receiving a current from a photodiode receiving a signal light and ambient light have been disclosed. In a preferred embodiment the front-end circuit accommodates a photo diode current, generated by a signal light from an infrared LED diode in presence of a current generated by ambient light for a rain-sensing system. The circuit invented has a high dynamic range comprising a programmable transresistance amplifier, a switched capacitor programmable gain amplifier and a switched capacitor fourth-order oversampled sigma-delta A/D converter including an optimized digital filter. Furthermore coarse and fine IDACs are used to successively subtract a current generated by ambient light.

51 Claims, 9 Drawing Sheets

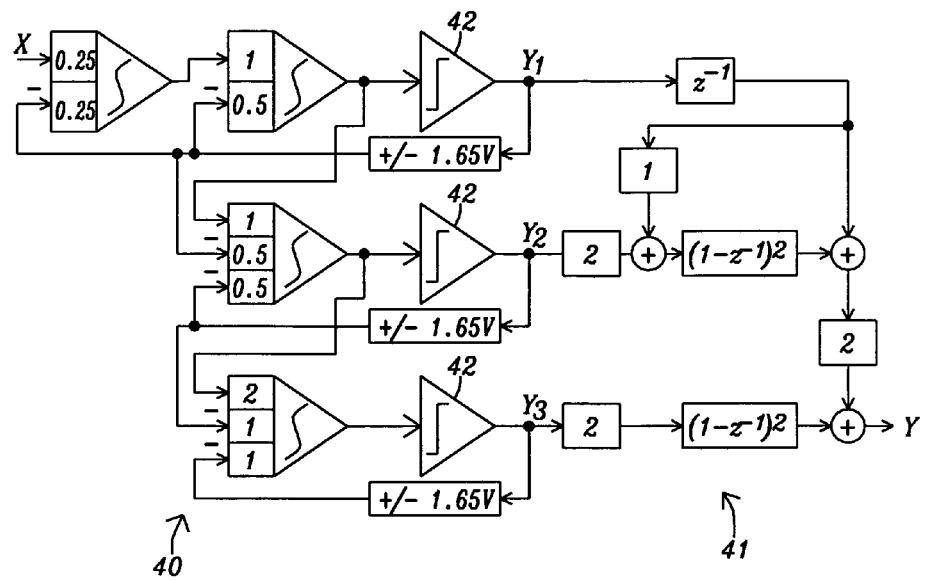
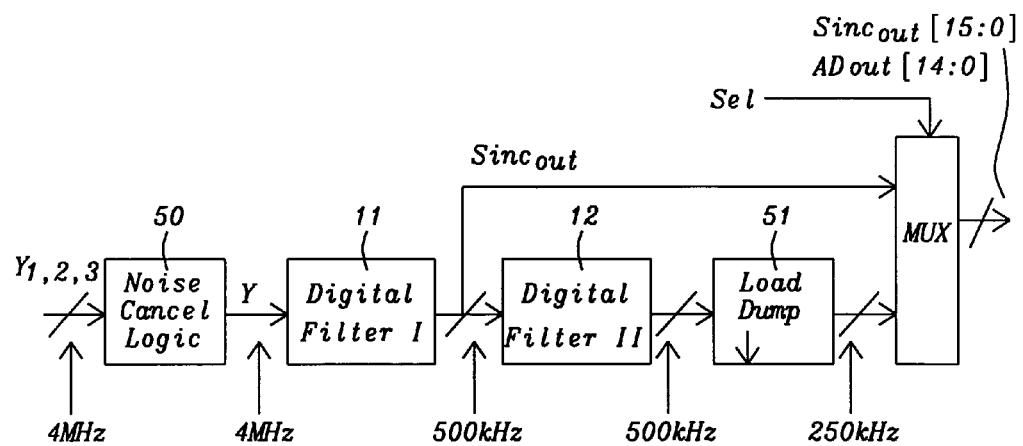
FIG. 4
FIG. 5

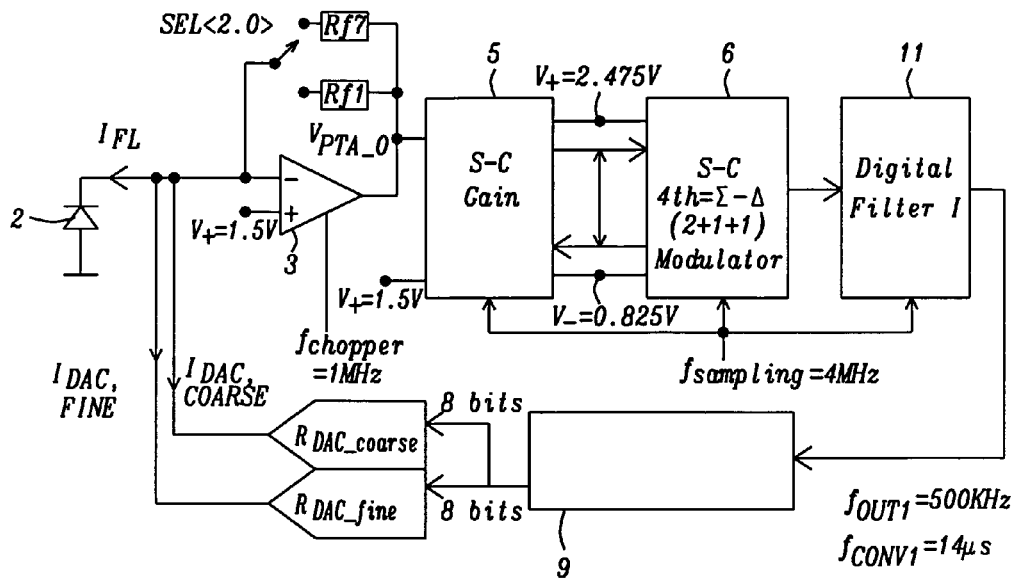
FIG. 8
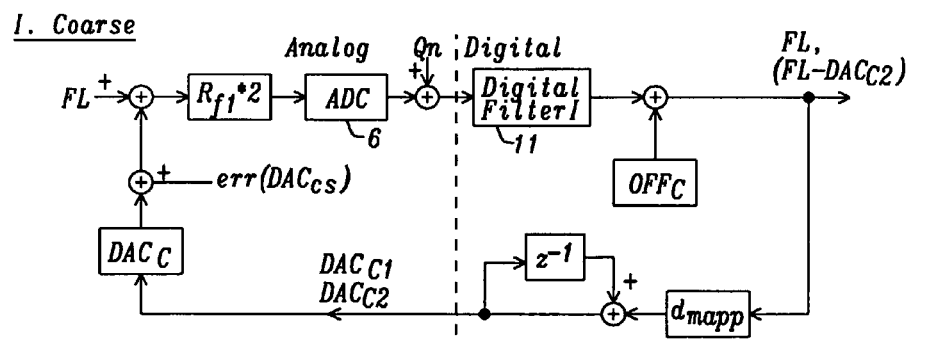
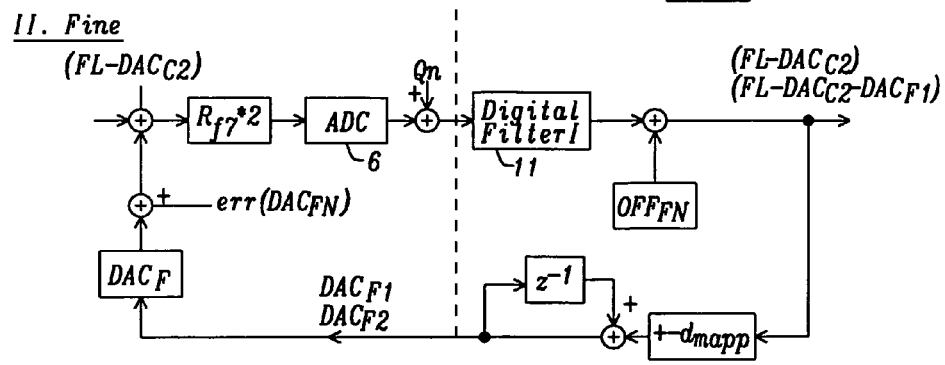
FIG. 9a

| | FL | (Fl-DAC$_{C1}$) | (Fl-DAC$_{C2}$) | (Fl-DAC$_{C2}$ -/+ DAC$_{F1}$) | (Fl-DAC$_{C2}$ -/+ DAC$_{F2}$) | |
|---|---|---|---|---|---|---|
| OFF$_C$ | OFF$_F$ | DAC$_{C1}$ | DAC$_{C2}$ | DAC$_{F1}$ | DAC$_{F2}$ | FL$_0$ |
| Offset extraction | | Coarse comp. | | Fine comp. | | |
| φ3_1=14μs | φ3_2=14μs | φ4_1=14μs | φ4_2=14μs | φ4_3=14μs | φ4_4=14μs | |

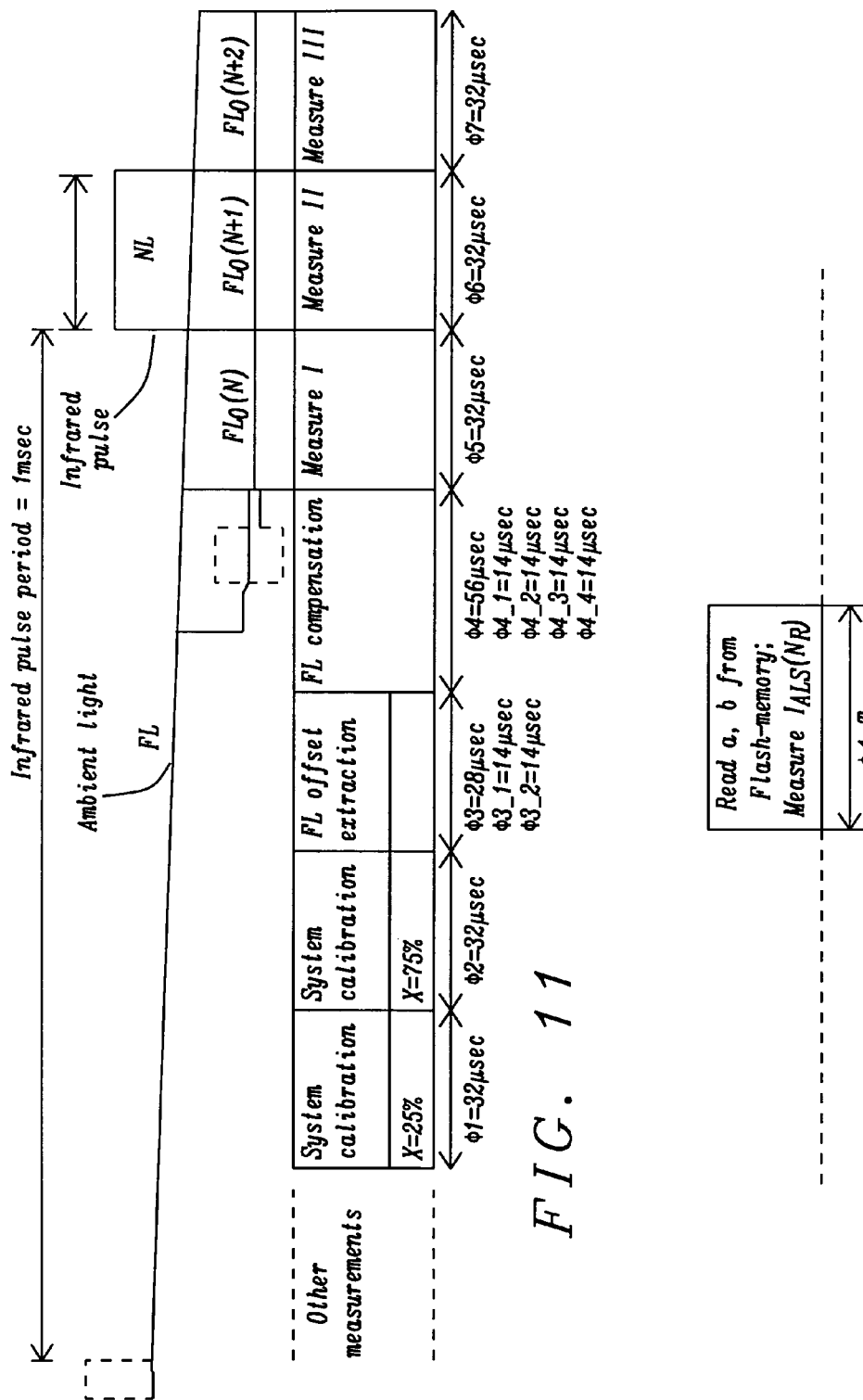

INFRARED PHOTOCURRENT FRONT-END ADC FOR RAIN-SENSING SYSTEM WITH AMBIENT LIGHT COMPENSATION

BACKGROUND OF THE INVENTION (1) Field of the Invention

This invention relates generally to a front-end circuit of an electro-optical sensing device and relates more specifically to accommodate an infrared pulse of a light receiving diode (LRD), receiving transmitted light from a light source, in presence of ambient current (ambient light in an LRD) for a rain-sensing system. This performs measurements of the attenuation of reflected infrared LED light due to increased scattering of light by rain.

(2) Description of the Prior Art

The usage of infrared senders and receivers is getting more and more popular and is known for numerous different applications and includes a transmitter (such as an infrared light emitting diode (LED)), which transmits light in the infrared range, and an optical receiver (phototransistor or photodiode or photo resistor), which converts the optical infrared signal into a proportional electrical signal.

Rain sensing systems should fulfill the following properties:
1. Providing a 14-bit dynamic range and 250 kHz output rate for accommodating an infrared pulse with an adequate conversion time in the order of 32 μsec.
2. Providing a resolution of 14-bit leading to an equivalent dynamic range about 160 dB of the infrared photocurrents.
3. Providing an ambient light compensation having resolution from e.g. 15 mA down to 1 μA with an accommodating time of about 50 μsec.
4. Providing an infrared current to ambient current ratio maximized by limiting the photocurrent bandwidth and increasing an analog-to-digital converter resolution.
5. Improvement in signal-to-noise ratio provided by correlated double sampling of the sequential measurements from the compensated ambient current and an infrared current pulse.
6. In summary, a high resolution, wide dynamic range, power efficiency and low cost are required Prior art systems do not cover completely these requirements.

Solutions dealing with photocurrent front-end systems including ADCs are described in the following patents:

U.S. patent (U.S. Pat. No. 7,019,321 to Kokuryo et al) proposes a rain sensing device that can estimate the size of raindrops or the like without a large amount of hardware resources, and its sensing method, and a wiper controlling apparatus using the same. In a sensing device, light emitted from a light-emitting member is introduced to a transparent plate, reflected by a sensing surface of the transparent plate and then received by a photo-detector, thereby detecting a condition of the sensing surface.

U.S. patent Publication (US 2009/0121889 to Lin et al.) discloses a proximity sensor including a driver, a photo-diode (PD) and an analog-to-digital converter (ADC). The proximity sensor can also include a controller to control the driver. The driver selectively drives a light source, e.g., an infrared (IR) light emitting diode (LED). The PD, which produces a current signal indicative of the intensity of light detected by the PD, is capable of detecting both ambient light and light produced by the light source that is reflected off an object. The ADC receives one or more portion of the current signal produced by the PD.

U.S. patent (U.S. Pat. No. 5,929,982 to Anderson) describes an active avalanche photo-diode (APD) and a gain control circuit for use in an optical receiver including a bias generator for varying the bias on a variable gain APD in response to bias control values generated by a controller. The controller receives the output of the optical receiver and determines the system noise of the receiver for the various bias control values. The system noise is compared to a threshold value for establishing the optimum bias for optimum gain of the APD. The gain control circuit is useable in an optical receiver in an optical time domain reflectometer (OTDR) for increasing the dynamic range of the OTDR. The optical receiver includes an amplifier section for amplifying the output of the APD and an analog-to-digital converter for receiving and converting the amplified output of the amplifier section to digital values representative of an optical input received at the APD.

SUMMARY OF THE INVENTION

A principal object of the present invention is to accommodate a current generated by a photo diode receiving a signal light from a LED in presence of ambient light to a front-end sensor system A further object of the invention is to accommodate a current generated by a photo diode receiving a signal light from an infrared LED in presence of ambient light to a front-end circuit of a rain-sensing system.

A further object of the invention is to achieve a front-end circuit having a high dynamic range.

A further object of the invention is to achieve a readout circuit with a high signal-to-noise ratio A further object of the invention is to maximize an infrared to ambient light ratio.

A further object of the invention is to increase a front end ADC resolution to 14 bits.

Moreover an object of the invention is to achieve a dynamic range of 160 dB of the infrared photocurrents.

In accordance with the objects of this invention a method to accommodate a photodiode current generated by a signal light from a light source in presence of ambient light has been achieved. The method invented comprises, firstly, the steps of: (1) providing a light receiving photo diode receiving a signal light pulse from a light source and a front end system comprising a continuous-time programmable transresistance amplifier converting input current through multi-scaled feedback resistors into a voltage, a digital unit, an analog-to digital converter and a digital-to-analog converter, (2) calibrating said front end system by digitally correcting each raw output of the analog-to-digital converter while the photo diode is disconnected, and (3) extracting offset for ambient light compensation. Furthermore the method invented comprises the steps of (4) accommodating the ambient light compensation, (5) accommodating compensated ambient light and signal light pulse, (6) go back to step (2) if system is ON, otherwise go to step (7), and (7) end.

In accordance with the objects of this invention a system to accommodate a photo diode current receiving a signal light of a sensor application in presence of ambient light having a high dynamic range has been achieved. The system invented comprises, firstly: said photo diode, receiving a signal light and ambient light, generating an output current; and a front-end circuit comprising: a programmable means to convert said output current of the photo diode to a voltage, a programmable means to amplify said voltage converted from the output current, and an analog-to-digital converter to convert said amplified voltage to digital values. Furthermore the front-end circuit comprises a first filtering means to filter the output of the analog-to-digital converter, a second filtering means to filter the output of the first filtering means, a digital unit receiving input from said first filtering means controlling current digital-to-analog converting means and generation of a current calibrating the system, and said current digital-to-analog converting means to successively subtract off a current generated by ambient light at an input of said programmable means to convert said output current of the photo diode to a voltage.

BRIEF DESCRIPTION OF THE DRAWINGS

In the accompanying drawings forming a material part of this description, there is shown:

FIG. 4 illustrates a block diagram of a switched-capacitor sigma-delta analog-to-digital converter stage of the circuit invented.

FIG. 5 shows a block diagram of a two-stage digital filter of the circuit invented.

FIG. 8 depicts a closed-loop for compensation of the current generated by ambient light using a digital mapping factor $d_{mapp}=1$ (85%–25%).

FIG. 9a illustrates coarse and fine control loops for a closed-loop compensation of ambient light.

FIG. 11 summarizes the sequence to measure an infrared current pulse.

FIG. 12 shows a sequence to measure an absolute photometry light, $I_{ALS}(N_R)$.

DESCRIPTION OF THE PREFERRED EMBODIMENTS

Figure 1:
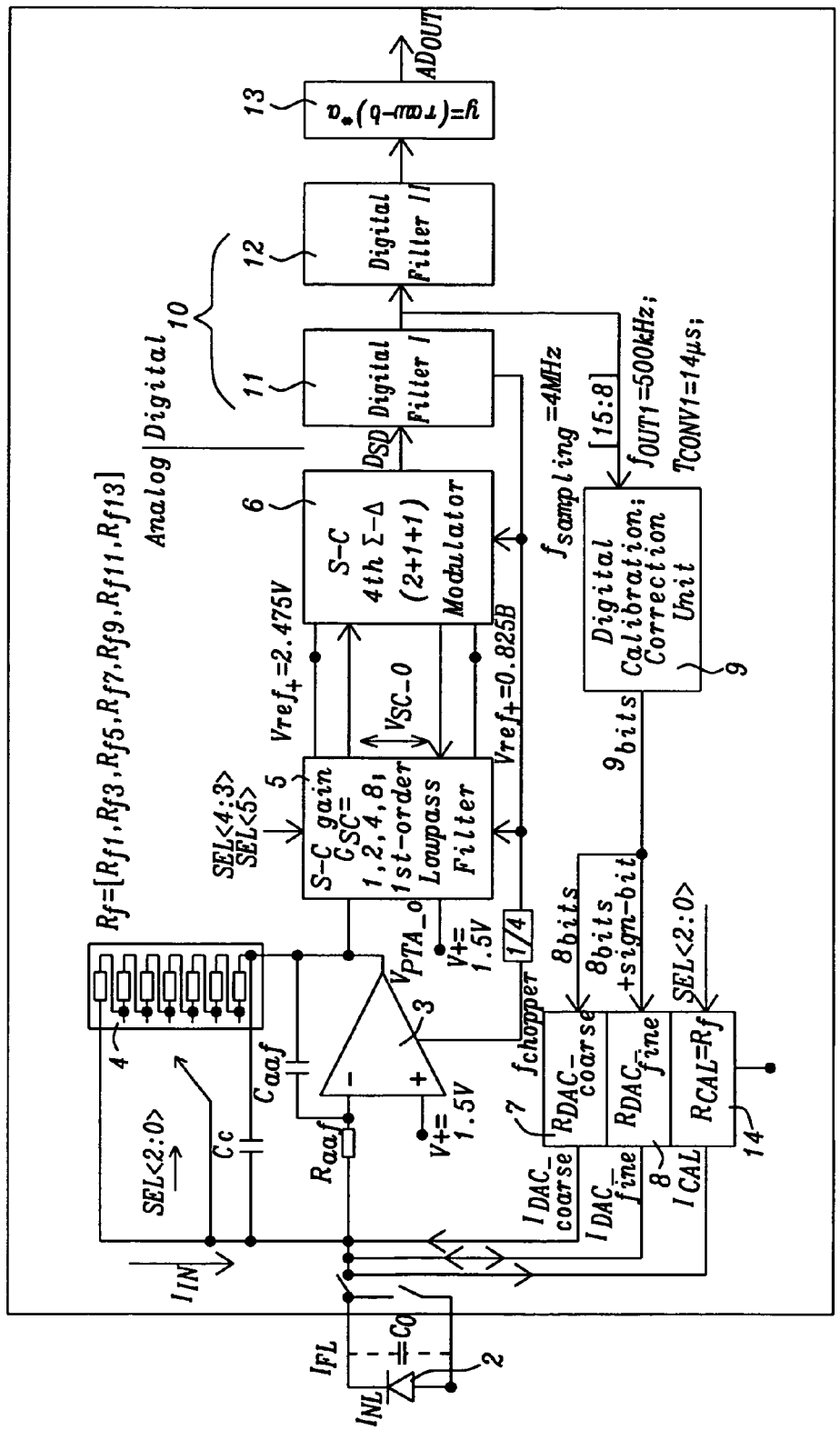
FIG. 1 shows a block diagram of a circuit for accommodating current generated by a LRD receiving infrared light for a rain-sensing system with ambient light compensation.

Systems and methods for circuits for a front end circuit to process signals from a photodiode, receiving in a preferred embodiment of the present invention infrared light from a light source as e.g. a light emitting diode (LED) for a rain sensing system It should be noted that the circuit could also be applied to other sensor systems A preferred embodiment of the front-end circuit 1 invented is illustrated in FIG. 1. It comprises a light receiving diode (LRD) 2 receiving infrared light from an infrared LED and generating a current $I_{NL}$, which depends upon the light from the infrared LED. Furthermore the photodiode 2 generates a current $I_{FL}$, which depends upon an ambient light. A shunt resistor (not shown) prevents the LRD from going into photovoltaic mode during inactive mode. Other wavelengths than infrared light could be applied with the circuit invented as well.

In order to achieve a high dynamic range the circuit comprises 1 a single-ended continuous-time programmable transresistance amplifier (PTA) 3. The PTA 3 converts the input current into a voltage. Transresistance refers to the ratio between a change of the output voltage and a related change of an input current. Furthermore the PTA 3 applies a fixed voltage, V+=1.5V, to the LRD photo diode. The feedback resistance $R_f$ 4 of the PTA 3 consists of 7 scales. Other arrangements of feedback resistors are possible as well.

Moreover a chopping frequency $f_{chopper}$ is applied to the PTA 3, i.e. a frequency modulation of input offset and 1/f noise, and autozeroing, i.e. correlated double sampling of input offset, to remove 1/f noise and system offset errors.

Furthermore the circuit 1 comprises a switched-capacitor programmable gain-stage 5 that limits the input bandwidth and amplifies the input span to that of the analog-to-digital (A/D) converter 6. The gain (S-C Gain) of the switched-capacitor gain stage 5 consists of 4 ratios. The combined effect of the adjusting results 14 current ranges by power of ½: 14.4 mA; 7.2 mA; . . . ; 3.6 μA; 1.8 μA.

The programmable gain amplifier 3 is clocked in the preferred embodiment by a sampling frequency of 4 MHz having a first-order low-pass corner frequency that converts the single-ended signal to a fully differential one, limits the photocurrent bandwidth, and amplifies the input span to that of the A/D converter 6 in order to optimize the signal to noise ratio.

The analog-to-digital (A/D) converter 6 of the preferred embodiment is a 16× oversampled fourth-order sigma-delta modulator (SDM), employs two-stage digital decimation filter, which deliverers full settled output data in 14 μsec having 10-bit resolution and in 32 μsec having 14-bit resolution. The fully differential range of the A/D converter is, as full-scale equal to +/–[Vref+–Vref–]=+/–1.65V, 3.3V centered at VDD×½=1.65V. The reference voltages are indicated in FIG. 1: Vref+=2.475 V and Vref–=0.825 V.

The A/D 6 converter employs a two-stage digital decimation filter 10, which delivers full settled output data in 14 μsec having 10 bit resolution and in 32 μsec having 14 bit resolution. Other types of A/D converters and reference voltages could be deployed as well.

Block 13 performs the digital normalization. The normalization justifies raw data received from the decimation filter according to stored gain (=a) and offset (=b) correction values, which are calculated from biasing on two measurements at 25% and 75% modulation densities, carried out during system calibration. The output y can be described by an equation:

$$y=(raw-b)\times a.$$

In the preferred embodiment the $R_{DAC\text{-}Coarse}$ resistance 7 consists of 256-tap resistors and the $R_{DAC\text{-}Fine}$ resistance 8 consists of 256-tap resistors having sign-bit. This together generates currents, represented by the $I_{DAC\text{-}Coarse}$ and $+\text{-}I_{DAC\text{-}Fine}$, to compensate the current generated by the ambient light, $I_{FL}$, from the receiver photodiode 2 at the transresistance amplifier 3 inputs. The resistance $R_{CAL}$ is a replica of the feedback resistance $R_f$. The resistance $R_{CAL}$ generates a current $I_{CAL}$, for system offset and gain correction.

It should be noted that all components shown in FIG. 1, except the LRD 2, are integrated in one chip, hence realizing a low-cost solution.

The following table illustrates input scales and output resolution of the DAC 6. The following values, as shown in FIG. 1, are used in the table: $I_{IN}$ is an input current of the PTA 3, $R_{F[1,3,5,7,9,11]}$ are feedback resistors of the PTA 3, $V_{PTA\_O}$ is the output voltage of the PTA 3, $G_{SC}$ is the gain of the switched-capacitor gain stage 5, having 4 ratios, $V_{SC\_O}$ is the output voltage of the switched-capacitor gain stage 5, $D_{SD}$ is the density of the Sigma-Delta Modulator 6 output, and $D_{SD} \times 2^{15}$ signifies the counts of the 14 bit ADC Digital Output $AD_{out}[14:0]$.

| | | | | | | | |
|---|---|---|---|---|---|---|---|
| | | | | Input Scales and Output Resolution | | | |
| | | | | Current Range | | | |
| $N_R$ | PTA Input $I_{IN}$ [A] | PTA Gain $R_{F[1,3,5,7,9,11]}$ [Ω] | PTA Single-ended Output to $V_+ = 1.5$ V $V_{PTA\_O}$ [$V_{PP}$] | S-C Gain $G_{SC}$ | S-C Gain Fully-differential Output to $V_{CM} = 1.65$ V $V_{SC\_O}$ [$V_{PP}$] | SDM Output = [$V_{SC\_O}$/ (2 * Vref+−)] $D_{SD}$ [Density] | ADC Digital Output $AD_{out}[14:0]$ $D_{SD} * 2^{15}$ [Counts] |
| 1 | 14.4 m | = $R_{f1}$ | 0.99 | | 1.98 | 0.85 | 27'852 |
| | 12 m | =68.8 | 0.825 | 2 | 1.65 | 0.75 | 24'576 |
| | 0 m | | 0 | | 0 | 0.25 | 8'192 |
| | −2.4 m | | −0.165 | | −0.33 | 0.15 | 4'915 |
| 2 | 7.2 m | = $R_{f1}$ | 0.495 | | 1.98 | 0.85 | 27'852 |
| | 6 m | =68.8 | 0.4125 | 4 | 1.65 | 0.75 | 24'576 |
| | 0 m | | 0 | | 0 | 0.25 | 8'192 |
| | −1.2 m | | −0.0825 | | −0.33 | 0.15 | 4'915 |
| 3 | 3.6 m | = $R_{f3}$ | 0.99 | | 1.98 | 0.85 | 27'852 |
| | 3 m | =275 | 0.825 | 2 | 1.65 | 0.75 | 24'576 |
| | 0 m | | 0 | | 0 | 0.25 | 8'192 |
| | −0.6 m | | −0.165 | | −0.33 | 0.15 | 4'915 |
| 4 | 1.8 m | = $R_{f3}$ | 0.495 | | 1.98 | 0.85 | 27'852 |
| | 1.5 m | =275 | 0.4125 | 4 | 1.65 | 0.75 | 24'576 |
| | 0 m | | 0 | | 0 | 0.25 | 8'192 |
| | −0.3 m | | −0.0825 | | −0.33 | 0.15 | 4'915 |
| 5 | 0.9 m | = $R_{f5}$ | 0.99 | | 1.98 | 0.85 | 27'852 |
| | 0.75 m | =1.1K | 0.825 | 2 | 1.65 | 0.75 | 24'576 |
| | 0 m | | 0 | | 0 | 0.25 | 8'192 |
| | −0.15 m | | −0.165 | | −0.33 | 0.15 | 4'915 |
| 6 | 450μ | = $R_{f5}$ | 0.495 | | 1.98 | 0.85 | 27'852 |
| | 375μ | =1.1K | 0.4125 | 4 | 1.65 | 0.75 | 24'576 |
| | 0μ | | 0 | | 0 | 0.25 | 8'192 |
| | −75μ | | −0.0825 | | −0.33 | 0.15 | 4'915 |
| 7 | 225μ | = $R_{f7}$ | 0.99 | | 1.98 | 0.85 | 27'852 |
| | 187μ | =4.4K | 0.825 | 2 | 1.65 | 0.75 | 24'576 |
| | 0μ | | 0 | | 0 | 0.25 | 8'192 |
| | −37.5μ | | −0.165 | | −0.33 | 0.15 | 4'915 |
| 8 | 112.5μ | = $R_{f7}$ | 0.495 | | 1.98 | 0.85 | 27'852 |
| | 93.5μ | =4.4K | 0.4125 | 4 | 1.65 | 0.75 | 24'576 |
| | 0μ | | 0 | | 0 | 0.25 | 8'192 |
| | −18.8μ | | −0.0825 | | −0.33 | 0.15 | 4'915 |
| 9 | 56.3μ | = $R_{f9}$ | 0.99 | | 1.98 | 0.85 | 27'852 |
| | 46.8μ | =17.6K | 0.825 | 2 | 1.65 | 0.75 | 24'576 |
| | 0μ | | 0 | | 0 | 0.25 | 8'192 |
| | −9.4μ | | −0.165 | | −0.33 | 0.15 | 4'915 |
| 10 | 28.2μ | = $R_{f9}$ | 0.495 | | 1.98 | 0.85 | 27'852 |
| | 23.4μ | =17.6K | 0.4125 | 4 | 1.65 | 0.75 | 24'576 |
| | 0μ | | 0 | | 0 | 0.25 | 8'192 |
| | −4.7μ | | −0.0825 | | −0.33 | 0.15 | 4'915 |
| 11 | 14.1μ | = $R_{f11}$ | 0.99 | | 1.98 | 0.85 | 27'852 |
| | 11.7μ | =70.4K | 0.825 | 2 | 1.65 | 0.75 | 24'576 |
| | 0μ | | 0 | | 0 | 0.25 | 8'192 |
| | −2.4μ | | −0.165 | | −0.33 | 0.15 | 4'915 |
| 12 | 7.1μ | = $R_{f11}$ | 0.495 | | 1.98 | 0.85 | 27'852 |
| | 5.85μ | =70.4K | 0.4125 | 4 | 1.65 | 0.75 | 24'576 |
| | 0μ | | 0 | | 0 | 0.25 | 8'192 |
| | −1.2μ | | −0.0825 | | −0.33 | 0.15 | 4'915 |
| 13 | 3.6μ | = $R_{f13}$ | 0.495 | | 1.98 | 0.85 | 27'852 |
| | 2.93μ | =140.8K | 0.4125 | 4 | 1.65 | 0.75 | 24'576 |
| | 0μ | | 0 | | 0 | 0.25 | 8'192 |
| | −0.6μ | | −0.0825 | | −0.33 | 0.15 | 4'915 |
| 14 | 1.8μ | = $R_{f13}$ | 0.2475 | | 1.98 | 0.85 | 27'852 |
| | 1.47μ | =140.8K | 0.2063 | 8 | 1.65 | 0.75 | 24'576 |
| | 0μ | | 0 | | 0 | 0.25 | 8'192 |
| | −0.3μ | | −0.0413 | | −0.33 | 0.15 | 4'915 |

The parameters behind resolution shown in the table above are following: the number of current ranges, $N_R$=14; the ratio between adjacent current ranges, R=2; and the $AD_{out}$[14:0] results 19,660 counts which is from 25% to 85% of the fullscale dynamic range of A/D converter and gives the effective number of bits, bits=14.2. Note that the combination results in an output given in counts=$R^{NR-1} \times 2^{bits}=2^{27.2}$, corresponding to 164 dB dynamic range for accommodating an infrared photocurrent.

For each adjacent current ranges, the $AD_{out}$[14:0] results in an output given in $$counts = D_{SD}(I_{in}) \times 2^{15}:$$

$$I_{in}=0, AD_{out}[14:0]=D_{SD}(I_{in}=0) \times 2^{15}=0.25 \times 2^{15}=8,192;$$

$$I_{in}=I_{max}, AD_{out}[14:0]=D_{SD}(I_{in}=I_{max}) \times 2^{15}=0.85 \times *2^{15}=27,852.8;$$

The difference yields 19,660 counts, and $2^X=19,660.8 \to X \sim 14.3$ bits.

Since infrared photodiode currents have quantum noise limited characteristics whereby their noise varies in proportion to the square-root of the signal level as $$\overline{i_{DN}}^2 = 2*q*I_D{}^{Bw},$$

wherein q is the charge on an electron, $I_D$ is the current through a diode. The short noise of the photodiode is proportional to the square-root of the signal level and to the square-root of its bandwidth. Bw is the short term of 'brick-wall bandwidth'. For a single-pole low-pass filter at $$Fp = \frac{1}{2\pi RC},$$

which has an equivalent brick-wall filter bandwidth of $$Fbw = \frac{1}{4RC}.$$

Because of this, large currents can be digitized with larger quantization stepsizes without appreciably increasing the total noise. The noise is most critical on the highest range where the input level is the smallest.

Therefore either increasing A/D converter resolution (linear proportional) or limiting the bandwidth (square-root proportional) is the mechanisms to increase the $i_{FL}/i_{NL}$ ratio ($I_D=I_{DN}+I_{FL}+I_{NL}$).

Figure 2:
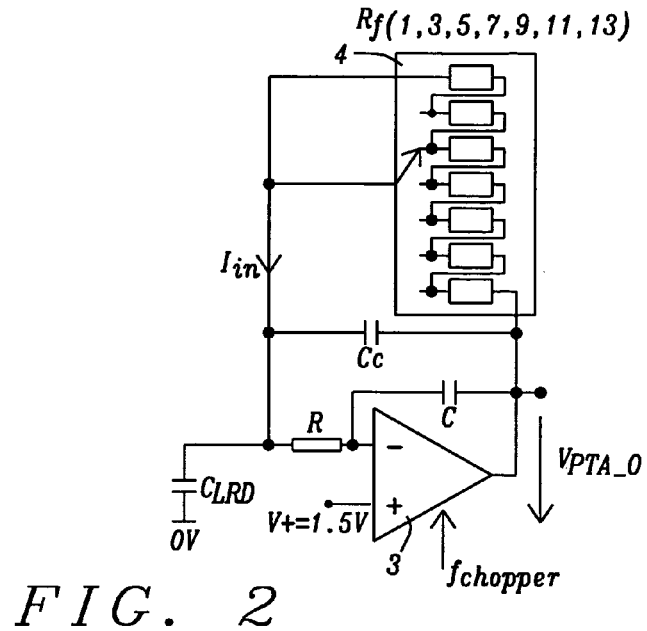
FIG. 2 illustrates a block diagram of the programmable transresistance amplifier (PTA) converting current to voltage, used in a preferred embodiment.

FIG. 2 illustrates a block diagram of the programmable transresistance amplifier (PTA) 3 converting current to voltage, used in a preferred embodiment.

The output voltage is given by $$V_{pta\_o}=i_{IN}*R_f+V_+,$$

wherein $i_{IN}$ is the input current of the PTA 3 and $R_f$ is the feedback resistor selected out of resistors array 4. The device 1/f noise and offset are continuously modulated out by $f_{chopper}$=1 MHz and suppressed by the digital filters.

The components, R and C, built a first-order low-pass corner frequency in the preferred embodiment above 125 kHz that acts as anti-aliasing filter to behind switched-capacitor circuit 5.

The resistors-array 4 is all built by series or parallel combination of two elementary resistors, Rf3=275Ω and Rf7=4.4 KΩ, as Rf1=Rf3/4, Rf3, Rf5=4×Rf3, Rf7, Rf9=4×Rf7, Rf11=16×Rf7 and Rf13=32×Rf7. Mismatch between any resistors Rf corresponds to a deviation of the output counts and then limits the accuracy. For this reason calibration current $I_{CAL}$ is added.

The selector-switches used to select a resistor out of the resistor array 4, which are pMOS and nMOS transistors have the same W/L ratio, are also stepped with weight (2048 μm/0.35 μm, 512 μm/0.35 μm, 128 μm/0.35 μm, 32 μm/0.35 μm, 8 μm/0.35 μm, 2 μm/0.35 μm), decreasing for higher resistance value, for each branch of the array, wide enough to ensure that the temperature dependency is about 2% of its voltage drop.

The mismatch in consecutive ratios ($R_{f,N+1}/R_{f,N}$ and $R_{f,N}/R_{f,N-1}$) causes a discontinuity gain error of (1+/−err)/(1−/+err)~1−/+err. A mismatch of integrated resistors-array done to 2% yields a discontinuity gain error about −/+2%.

These gain errors can be corrected down to less than 0.01%, as well as the temperature deviation of the gain, when system calibration is performed during every measurement.

Figure 3:
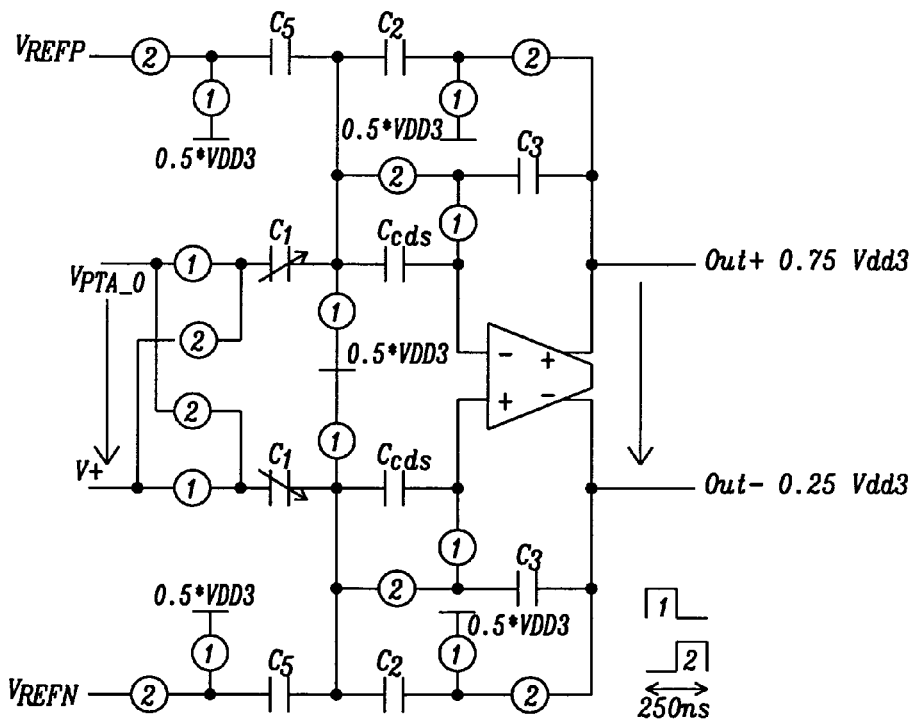
FIG. 3 shows a programmable switched-capacitor gain stage of the circuit invented.

FIG. 3 shows a preferred embodiment of the programmable switched-capacitor (S/C) gain stage 5 of the circuit invented.

The S-C gain stage 5 is a correlated-double-sampling (=2× $f_S$) switched-capacitor instrumentation amplifier with gain ratios, $G_{SC}$=1, 2, 4, and 8, provided by capacitors $C_2$ and $C_1$. The device 1/f noise and offset are subsequently sampled on capacitors $C_{cds}$ in clock phase 1 and canceled in clock phase 2. An additional branch comprising capacitors $C_3$ and $C_2$ results the low-pass −3 dB corner frequency, $f_C$=62.5 kHz.

The numbers 1 and 2 in the circles of FIG. 3 signify are nonoverlapping clocks, which are related to the 4 MHz sampling clock. Number 1 corresponds to the high phase of the 4 MHz sampling clock; number 2 corresponds to the low phase of the 4 MHz sampling clock.

Thereby, the input bandwidth has been limited, reducing the contribution of white noise. The single-ended input is adapted to the fully differential output between 0.825V and 2.475V by using the sampling sequence in the two paths of the input circuit. The sampling frequency is, $f_S$=4 MHz.

The transfer function of the S/C gain stage is:

$$H_{Gsc}(z) = \left[ \frac{C_1}{C_2} * \frac{(z^{-1/2}+z^{-1})}{\left(\left(1+\frac{C_3}{C_2}\right)-\frac{C_3}{C_2}*z^{-1}\right)} \right] - \frac{C_5}{C_2}*(V_{REFP}-V_{REFN});$$

$$V_{REFP}=2.475\ V\ \text{and}\ V_{REFN}=0.825\ V.$$

The low-pass corner frequency, $f_C$=62.5 kHz, can be bypassed by disconnecting the capacitor branch of $C_3$.

FIG. 4 illustrates a block diagram of a switched-capacitor sigma-delta analog-to-digital (A/D) converter stage 6 of the circuit invented. FIG. 4 shows a preferred embodiment comprising an analog sigma-delta modulator 40 and digital noise cancellation logic 41.

Low oversampling ratio of 16 related to a sampling clock, $f_S$=4 MHz, led to a fourth-order architectural approach to achieve a 14-bit resolution. A two+one+one cascaded switched-capacitor sigma-delta A/D converter is deployed where each delayed integrator has a transfer function $z^{-1}/(1-z^{-1})$, is clocked by $f_S$=4 MHz. This structure is stable since they benefit cascaded low-order modulator loops to enhance their noise shaping property.

Single-bit quantizers 42 are used with differential quantization levels, (Vref+−Vref−)=1.65V and (Vref−−Vref+)=−1.65V, centered at VDD*½=1.65V providing full-scale ranging 3.3V (100% density).

If X is the signal and Qn is the quantization noise, then the output Y of the digital noise cancellation logic 41 is $$Y(z)=z^{-4}*X(z)+(1-z^{-1})^4*Qn(z).$$

The digital cancellation logic 41 is an integral part of the sigma-delta A/D converter 40, which results a fourth-order high-pass filter of the quantization noise Qn.

The digital output Y is an oversampled fourth-order noise-shaped signal, the complete A/D converter requires a digital decimation filter to perform down-sampling and out-band noise filtering.

The digital filter has been selected to provide a 15-bit resolution maintaining the signal-to-quantization noise ratio (SQNR) and fast impulse response. Since a fast settling defines a minimum width of the infrared pulse and accommodating time of an ambient light compensation.

FIG. 5 shows a block diagram of a two-stage digital filter of a preferred embodiment the circuit invented. The approach comes in a two-stage digital filter as shown. The input Y corresponds to the output shown in FIG. 4.

The first stage comprises a noise cancellation logic 50 and a modified fifth-order sinc filter 11 with the down-sampling ratio of 8. In signal processing, a sinc filter is an idealized filter that removes all frequency components above a given bandwidth, leaves the low frequencies alone, and has linear phase. The filter's impulse response is a sinc function in the time domain, and its frequency response is a rectangular function.

It is an "ideal" low-pass filter in the frequency sense, perfectly passing low frequencies, perfectly cutting high frequencies; and thus may be considered to be a brick-wall filter. Other low pass filter could be used alternatively. The transfer function of the sinc filter is:

$$H_{SINC}(z) = \left[\frac{1}{1-z^{-1}}\right]^5 * \frac{1}{8} * (1 - 4*z^{-1} + 5*z^{-2} + 0*z^{-3} - 5*z^{-4} + 4*z^{-5} - z^{-6}).$$

The output rate is 500 kHz of the digital filter 11 and the impulse response is 14 μsec.

The second stage is a 9-tap finit impulse response (FIR) filter 12 having same input and output rate of 500 kHz. Its transfer function is:

$$H_{FIR}(z) = 3'072 + 6'064*z^{-1} + 14'622*z^{-2} + 18'419*z^{-3} +$$
$$23'103*z^{-4} + 18'419*z^{-5} + 14'622*z^{-6} + 6'064*z^{-7} + 3'072*z^{-8}.$$

The impulse response time of the second stage is 18 μsec. The output rate of the FIR filter 12 is then lowered by 2 to 250 kHz.

The combination of fourth-order sigma-delta A/D converter 6 and first digital filter 11 (sigma-delta ADC 6 and sinc filter 11) results an output rate of 500 kHz and an impulse response, $T_{CONV1}$=14 μsec, having 10-bit resolution.

The complete A/D converter (fourth-order sigma-delta ADC 6, sinc filter 11, and FIR filter 12) results an output rate of 250 kHz and an impulse response, $T_{CONV}$=32 μsec, having 14-bit resolution. The reduction of an output rate of 500 kHz from the FIR filter 12 to the output rate of 250 kHz is performed in a load dump block 51.

Figure 6:
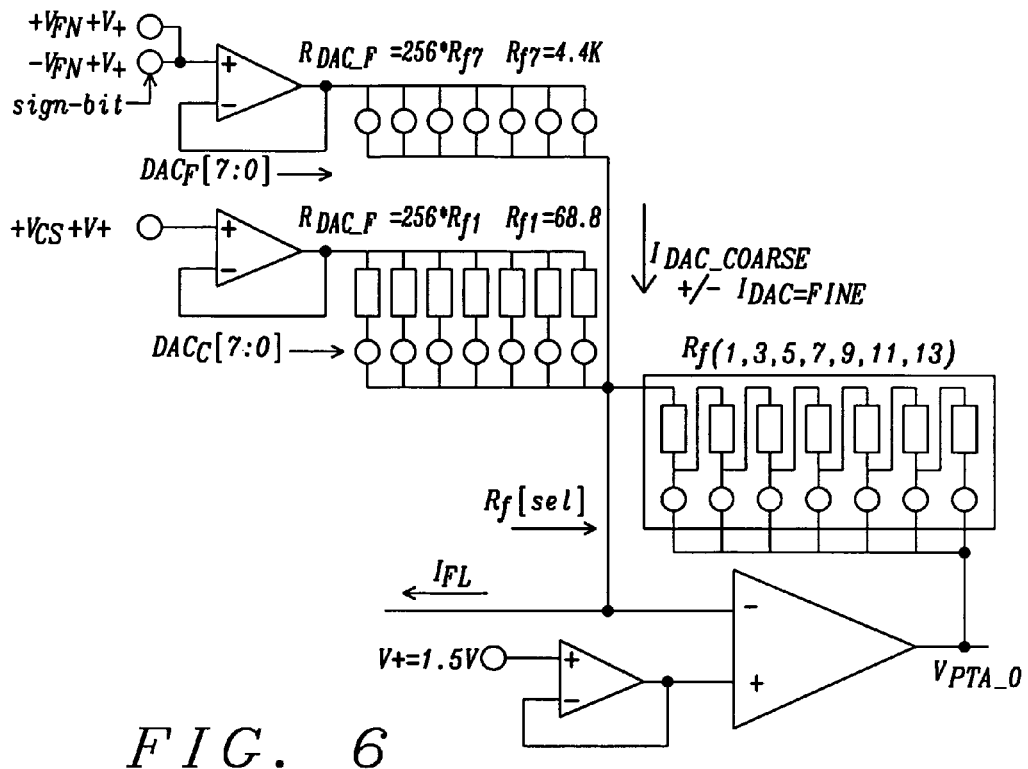
FIG. 6 illustrates how the coarse and the fine current sources are generated.

A first step to the compensation of the current IFS generated by ambient light, as shown in FIG. 1, is the generation of coarse and fine current sources. FIG. 6 illustrates how the coarse and the fine current sources are generated The currents $I_{DAC\text{-}Coarse}$ and $I_{DAC\text{-}Fine}$ are generated by a correspondent constant voltage across correspondent resistors $R_{DAC\_F}$ or $R_{DAC\_C}$. The resistors are referred to the PTA 3 gain resistors $R_{f1}$ and $R_{f7}$. As mentioned above in the description of the PTA 6 $R_{f1}$ is built by a parallel combination of the elementary resistor $R_{f3}$=275Ω, namely $R_{f1}=R_{f3}/4$ and $R_{f7}$=4.4 kΩ. In this case, all resistors are matched, the dependencies on the supply voltage and on the temperature deviation of the single-ended reference voltage are canceled.

1. $I_{DAC\text{-}COARSE}$=[$V_{CS}/(R_{f1}*256)$]*(DAC$_C$[7:0]+1) and $V_{CS}$=0.99V+$V_+$;

$I_{DAC\text{-}COARSE}$ (Msb)=14.4 mA and $I_{DAC\text{-}COARSE}$ (Lsb)= 56.25 μA.

2. $I_{DAC\text{-}FINE}$=+-[$V_{FN}/(R_{f7}*256)$]*(DAC$_F$[7:0]+1) and $V_{FN}$=+/-0.99V+$V_+$;

$I_{DAC\text{-}FINE}$ (Msb)=225 μA and $I_{DAC\text{-}FINE}$ (Lsb)=0.88 μA

The current $I_{FL}$ is flowing from the junction with Vpta_o=$I_{FL}$×$R_f$+$V_+$; the current $I_{DAC\_COARSE}$+/-$I_{DAC\_FINE}$ flows in the junction with Vpta_o=-($I_{DAC\_COARSE}$+/-$I_{DAC\_FINE}$)×$R_f$+$V_+$. The total current flows to the feedback resistor, Rf, and results the output voltage Vpta_o=[$I_{FL}$-($I_{DAC\_COARSE}$+/-$I_{DAC\_FINE}$)]×$R_f$+$V_+$.

Figure 7:
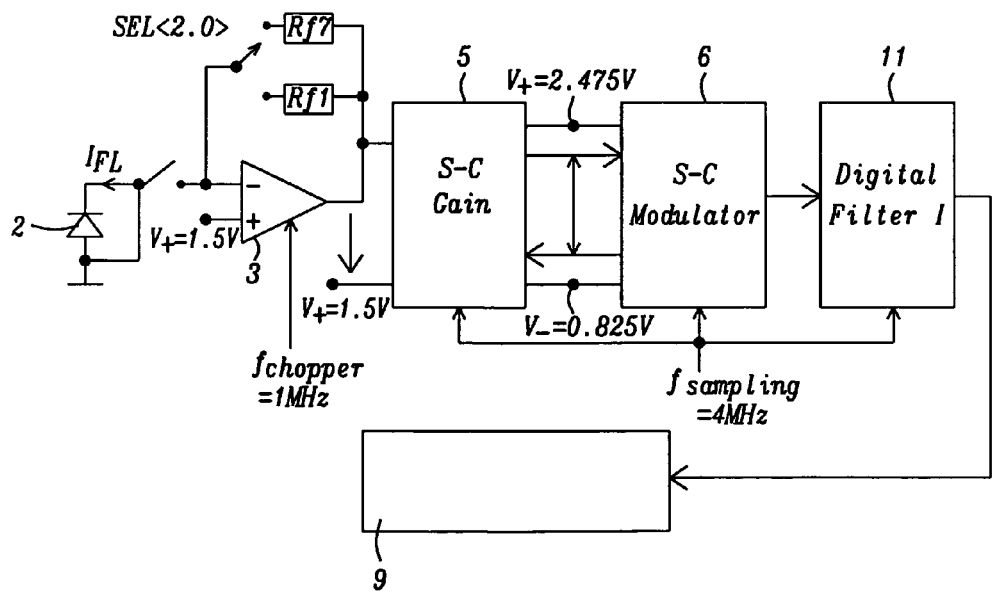
FIG. 7 shows an offset extraction for coarse- and fine loop for $I_{FL}$ compensation branches.

Another step to the compensation of the current $I_{FL}$ generated by ambient light, as shown in FIG. 1, is a removal of system-offset errors. FIG. 7 shows an offset extraction for coarse- and fine loop for $I_{FL}$ compensation branches.

In order to perform offset extraction the front infrared diode 2 is disconnected and the ADC 6 is set with conversion time, $T_{CONV1}$=14 μsec for the offset extraction. The following steps are performed for the offset extraction:

1. set Rf=Nr 1, the offset of coarse loop is measured and stored in OFF$_C$ in the digital calibration and Correction Unit 9.
2. set Rf=Nr 7, the offset of fine loop is measured and stored in OFF$_F$ in the digital calibration and Correction Unit 9.

A further step to the compensation of the current $I_{FL}$ generated by ambient light is a closed loop compensation. FIG. 8 depicts a closed-loop for compensation of the current generated by ambient light using a digital mapping factor $d_{mapp}$=1/(85%−25%). The ADC is scaled to deliver digital output from 25% to 85% of its analog input from 0% to 100%. The digital mapping factor $d_{mapp}$=(100%−0%)/(85%−25%), since the DAC$_C$[7:0] and DAC$_F$[7:0] are scaled from 0% to 100% as h'0=0 and h'FF=$I_{MSB}$.

The input for the digital-to-analog conversion performed by the resistor arrays $R_{DAC\_COARSE}$ and $R_{DAC\_FINE}$ is set by the digital Calibration and Correction Unit 9. The 15 bit output of the fifth order sinc filter 11 is used for this digital-to-analog conversion. The input for the conversion to the analog value of $I_{DAC\_COARSE}$ is DAC$_C$[7:0]=dMAPP×(sinc$^5$[15:0]−OFF$_C$[25%]); the input for the conversion to the analog value of $I_{DAC\_fine}$ is DAC$_F$[7:0]=±dMAPP×(sinc$^5$[15:0]−OFF$_F$[25%]). As described above the offset values OFF$_C$ and OFF$_F$ have been stored in a previous step during offset extraction in the digital Calibration and Correction Unit 9.

FIG. 9a illustrates coarse and fine control loops for a closed-loop compensation of the current $I_{FL}$ generated by ambient light, wherein the digital mapping factor is dmapp=1/(85%−25%). The current $I_{FL}$ generated by ambient light is subtracted through a close-loop compensation from the signal current.

The output of the coarse compensation steps is used as the input for the fine compensation.

The table below describes in detail the operation of the circuit of FIG. 9a, namely the coarse and fine compensation of ambient light.

Figures 9B, 10:
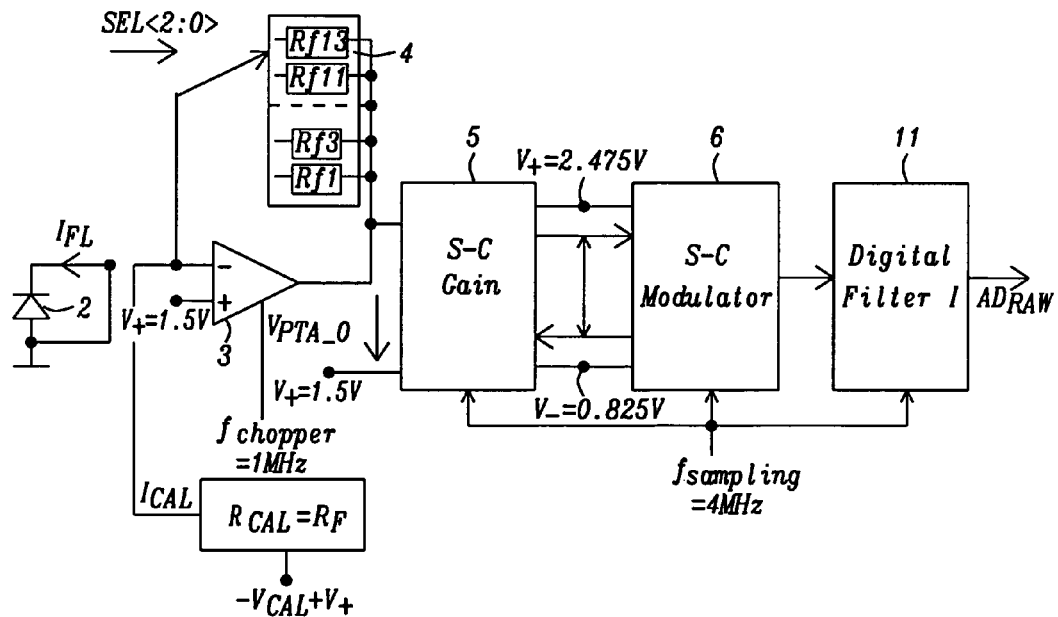
FIG. 9b illustrates a preferred embodiment of an ambient light compensation sequence.
FIG. 10 illustrates how calibration currents $I_{CAL}$ are applied to extract the gain and offset errors during system calibration.

FIG. 9b illustrates a preferred embodiment of an ambient light compensation sequence. Before a compensation of ambient light starts an offset extraction has to be performed. As described above the first step of the offset extraction is the coarse offset extraction during 14 μsec followed by the fine offset extraction during another 14 μsec. The offset extraction is followed by a coarse compensation performed in two steps, each of which has a duration of again 14 μsec. In the first step of the coarse compensation the current $I_{FL}$ generated by ambient light is defined and stored under $DAC_{C1}[7:0]$, while no signal from an infrared sensor diode is present. In the second step of the coarse compensation the value of $DAC_{C1}$ is subtracted from the current $I_{FL}$ and stored under $DAC_{C2}[7:0]$. A fine compensation follows the coarse compensation also performed in two steps having each also a duration of 14 μsec. The details of the fine compensation are described in the table below:

The following table illustrates the compensation steps of FIG. 9b in more detail:

| FL Coarse Compensation: | |
|---|---|
| Step I Φ4_1 | set $N_R = 1$, i.e. $R_f = R_{f1}$ and $G_{sc} = 2$; |
| | measures FL: sinc_out = FL; |
| | set $DAC_{C1}[7:0] = d_{mapp} \times (\text{sinc\_out} - OFF_C[7:0])$; |
| Step II Φ 4_1 | measure (FL − $DAC_{C1}$): sinc_out = (FL − $DAC_{C1}$); |
| | set $DAC_{C2}[7:0] = DAC_{C1}[7:0] + d_{mapp} *(\text{sinc\_out} - OFF_C[7:0])$; |
| FL Fine Compensation: | |
| Step III Φ 4_3 | set $N_R = 7$, i.e. $R_f = R_{f7}$ and $G_{sc} = 2$; |
| | measure (FL − $DAC_{C2}$): sinc_out = (FL − $DAC_{C2}$); |
| | if {sinc_out} > $OFF_F[7:0]$;   (FL − $DAC_{C2}$ >0); |
| | set 'sign-bit' =0;              (for analog +$V_{FN}$ generation); |
| | set $DAC_{F1}[7:0] = d_{mapp} *(\text{sinc\_out} - OFF_F[7:0])$; |
| | else if {sinc_out} < $OFF_F[7:0]$;   (FL − $DAC_{C2}$ <0); |
| | set 'sign-bit' =1;              (for analog −$V_{FN}$ generation); |
| | set $DAC_{F1}[7:0] = -d_{mapp} *(\text{sinc\_out} - OFF_F[7:0])$; |
| Step IV Φ 4_3 | measure (FL − $DAC_{C2}$ − $DAC_{F1}$): sinc_out = (FL − $DAC_{C2}$ − $DAC_{F1}$); |
| | Case I {'sign-bit' = 0}: |
| | set $DAC_{F2}[7:0] = DAC_{F1}[7:0] + d_{mapp} *(\text{sinc\_out} - OFF_F[7:0])$; |
| | Case II {'sign-bit' = 1}: |
| | set $DAC_{F2}[7:0] = DAC_{F1}[7:0] - d_{mapp} *(\text{sinc\_out} - OFF_F[7:0])$. |

In order to compensate gain and offset errors a system calibration is performed. The overall system, shown in FIG. 1, performs the digitizing of input current and results in form with gain and offset errors:

$$\frac{AD_{OUT}[14:0]}{2^{15}} = I_{IN} * R_f * \left(\frac{G_{SC}}{V_{REF+,REF-}}\right) * \left(1 \pm err\left[\frac{G_{SC}}{V_{REF+,REF-}}\right]\right) + 0.25 * (V_{REF+,REF-}) * (1 \pm err[V_{REF+,REF-}])$$

wherein, as shown in FIG. 1, $AD_{out}$ is the output voltage of the circuit, $I_{IN}$ is the current through the feedback resistors $R_f$ 4, $G_{SC}$ is the gain of the S-C gain 5, and Vref+ and Vref− are the reference voltages shown in FIG. 1.

To obtain a high degree of linearity, each raw output of the A/D converter 6 is digitally corrected by subtracting the offset and multiplying by the appropriate gain correction term:

$ADout_{CORR}=(ADout-\text{offset}[\text{ranges}]) \times G_{CORR}[\text{ranges}] = (\text{raw}-b[N_R]) * a[N_R]$.

The parameters $b[N_R]$ and $a[N_R]$ are digitally extracted by adding two equivalent inputs, $I_{CAL}$'s, during system calibration:

1. $AD_{RAW}(25\%, N_R)$:=set $R_f(N_R)$, $G_{SC}(N_R)$, and $I_{CAL}=0$;
2. $AD_{RAW}(75\%, N_R)$:=set $R_f(N_R)$, $G_{SC}(N_R)$, and $I_{CAL}=[V_{CAL}/R_f(N_R)]$.
3. $b[N_R]=2^{13}-AD_{RAW}(25\%, N_R)$; $a[N_R]=2^{14}/[ADCraw(75\%, N_R)-ADCraw(25\%, N_R)]$.

FIG. 10 illustrates how calibration currents $I_{CAL}$ are applied to extract the gain and offset errors during system calibration. The LRD 2 is disconnected during the calibration shown in FIG. 10. The table below shows the parameters of calibration, wherein $V_{CAL}$ is an input voltage and $V_{PTA\_o}$ is an output voltage of the PTA 3.

| | | | Current Range | | | | |
|---|---|---|---|---|---|---|---|
| | $PTA_{input}$ | $PTA_{gain}$ | | | | | |
| | $V_{CAL}$ [V] | $R_F$ [Ω] | | | | | |
| | $I_{CAL}(25\%) = 0$; | | $PTA_{out}$, s.e | | $SC_{out}$, f.d at | | |
| | $I_{CAL}(75\%) = -V_{CAL}/$ | | at $V_+ = 1.5$ V | $SC_{gain}$ | $V_{CM} = 1.65$ V | SDM Output | $AD_{RAW}[14:0]$ |
| $N_R$ | $R_F$ | | $V_{PTA\_O}$ [$V_{PP}$] | $G_{SC}$ | $V_{SC\_O}$ [$V_{PP}$] | $D_{SD}$ [Density] | $D_{SD} * 2^{15}$ [lsb] |
| 1 | 0; 0.825 | 68.8 | 0; 0.825 | 2 | 0; 1.65 | 0.25; 0.75 | $2^{13}$; |
| 2 | 0; 0.4125 | | 0; 0.4125 | 4 | | | $(2^{13} + 2^{14})$ |
| 3 | 0; 0.825 | 275 | 0; 0.825 | 2 | 0; 1.65 | 0.25; 0.75 | $2^{13}$; |
| 4 | 0; 0.4125 | | 0; 0.4125 | 4 | | | $(2^{13} + 2^{14})$ |
| 5 | 0; 0.825 | 1.1K | 0; 0.825 | 2 | 0; 1.65 | 0.25; 0.75 | $2^{13}$; |
| 6 | 0; 0.4125 | | 0; 0.4125 | 4 | | | $(2^{13} + 2^{14})$ |
| 7 | 0; 0.825 | 4.4K | 0; 0.825 | 2 | 0; 1.65 | 0.25; 0.75 | $2^{13}$; |
| 8 | 0; 0.4125 | | 0; 0.4125 | 4 | | | $(2^{13} + 2^{14})$ |
| 9 | 0; 0.825 | 17.6K | 0; 0.825 | 2 | 0; 1.65 | 0.25; 0.75 | $2^{13}$; |
| 10 | 0; 0.4125 | | 0; 0.4125 | 4 | | | $(2^{13} + 2^{14})$ |
| 11 | 0; 0.825 | 70.4K | 0; 0.825 | 2 | 0; 1.65 | 0.25; 0.75 | $2^{13}$; |
| 12 | 0; 0.4125 | | 0; 0.4125 | 4 | | | $(2^{13} + 2^{14})$ |
| 13 | 0; 0.4125 | 140.8K | 0; 0.4125 | 4 | 0; 1.65 | 0.25; 0.75 | $2^{13}$; |
| 14 | 0; 0.2063 | | 0; 0.2063 | 8 | | | $(2^{13} + 2^{14})$ |

In regard of infrared pulse measurement, using the circuitry outlined above an infrared signal pulse from the LRD 2 is measured in 7 steps for one current range as illustrated in FIG. 11. FIG. 11 summarizes the sequence to measure an infrared current pulse. FIG. 11 shows the ambient light FL and an infrared signal pulse NL. Furthermore a previous signal pulse 110 is indicated.

The steps of the sequence of FIG. 11 comprise:

Step φ1 and φ2: System Calibration

Front Infrared LRD is disconnected; two measurements are executed with an A/D conversion time, $T_{CONV}$=32 μsec.

Step φ3: Offset Extraction for Ambient Light, $i_{FL}$, Compensation

The switched-capacitor low-pass filter sector, $f_C$=62.5 KHz, and the second-stage digital filter are bypassed; two measurements are executed with an A/D conversion time, $T_{CONV1}$=14 μsec.

Step φ4: Accommodating the Ambient Light, $i_{FL}$, Compensation

Front Infrared LRD is connected; four subsequent measurements are executed with an A/D conversion time, $T_{CONV1}$=14 μsec.

Step φ5, φ6, and φ7: Accommodating the Compensated Ambient Light, $I_{FL0}$, and infrared pulse, $I_{NL}$ The switched-capacitor low-pass filter sector, $f_C$=62.5 KHz, and the second-stage digital filter are enabled; three measurements are executed with an ADC conversion time, $T_{CONV}$=32 μsec.

The results are performed by digitally subtract of the measurements φ6 and φ5 (=$I_{NL}$), and of the measurements, φ7 and φ5 (=$\Delta I_{FL}$), which are characterized as correlated double sampling (CDS) with a CDS frequence, $f_{CDS}$=1/$T_{CONV}$.

It has to be noted that the CDS achieves a first-order high-pass factor, (1−$z^{-1}$), which increases the in-band (=$f_{CDS}$) contribution of uncorrelated white noise power by 3 dB due to the twice sampling; however it attenuates the in-band correlated noise power and all components with frequency below the $f_{CDS}$/2. Therefore improves the total SNR (signal to noise ratio) for given pulse width of $T_{CONV}$.

Another embodiment of the invention can be used for Absolute Photometry (ALS) measurement. The measurement of the absolute visible light, IALS, is executed in 1 step for one current range. FIG. 12 shows a sequence to measure an absolute photometry light, $I_{ALS}$ ($N_R$). The single step to measure the absolute visible light comprises:

Step φ1: Light, $i_{ALS}$, Measurement

Front Infrared photodiode is connected; current range is selected; read gain correction factor in memory; one measurement is executed with an A/D conversion time, $T_{CONV}$=32 μsec. The factors a and b are known from system calibration and are read from a flash memory.

Figure 13:
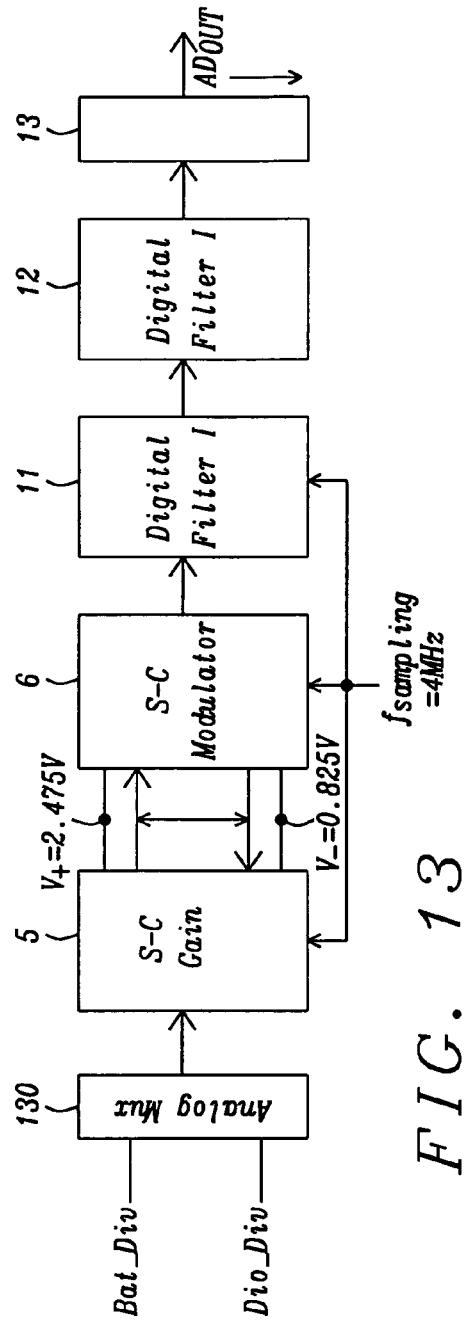
FIG. 13 depicts a multi-purpose ADC to measure a transmitter LED forward voltage for extraction the $\Delta V_{diode}$ (T).

FIG. 13 depicts a multi-purpose A/D converter to measure a transmitter LED forward voltage for extraction the $\Delta V_{diode}$ (T), i.e. the temperature dependency of the forward voltage of a transmitter LED. This can be performed by a third embodiment of the present invention. An analog multiplexer 130 sets two different voltages causing two different currents $I_{D1}$ and $I_{D2}$ to flow through a transmitter diode. Furthermore the embodiment comprises a switched capacitor gain S-C gain 5, a fourth-order sigma-delta modulator 6 and a two-stage decimation filter 11 and 12 having a 14 bit resolution. The extraction of the transmitter LEDs $\Delta V_{diode}$ (T) can be done by software after the measure sequence; which is illustrated in FIG. 14.

Figure 14:
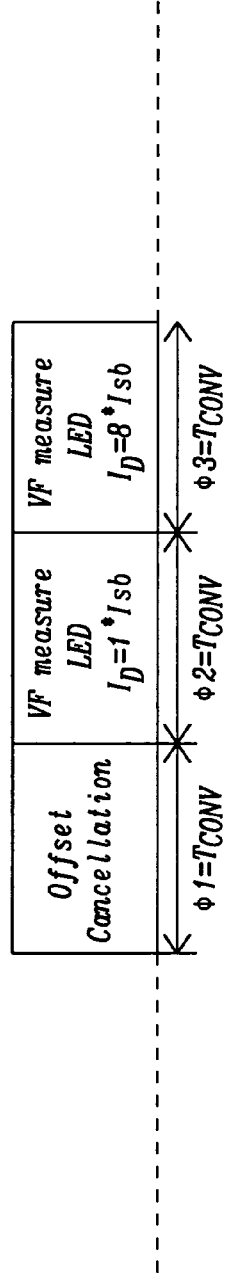
FIG. 14 illustrates a sequence to measure the transmitter LEDs $\Delta V_{diode}$ (T) with a current density ratio=8.

FIG. 14 illustrates a sequence to measure the transmitter LEDs $\Delta V_{diode}$ (T) with a current density ratio=8 using the third embodiment of the invention shown in FIG. 13. The measurement comprises three phases. In a first phase an offset cancellation is performed, in a second phase a first voltage forward of the diode is performed using a low current, in the third phase a voltage forward measurement of the diode is performed using a high current. It is obvious that the second and third phase can be interchanged.

Figure 15:
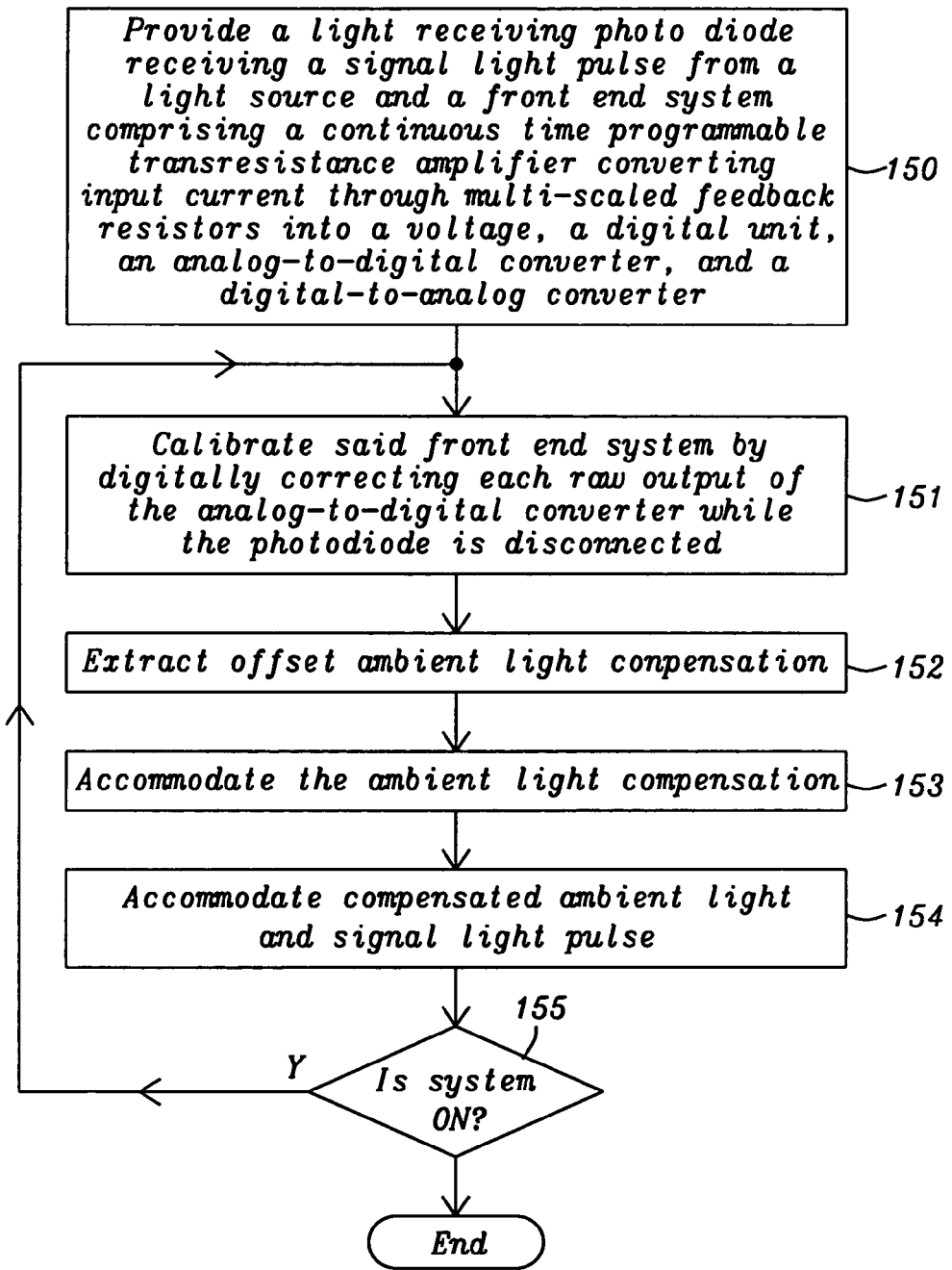
FIG. 15 illustrates a flowchart of a method invented to accommodate an infrared photodiode current generated by a signal light from a LED diode in presence of ambient light to a rain sensing system.

FIG. 15 illustrates a flowchart of a method invented to accommodate an infrared photodiode current generated by a signal light from a LED diode in presence of ambient light to a rain sensing system. It should be noted that the method invented could also be used for other sensor systems using photodiodes. A first step 150 describes the provision of a light receiving photo diode receiving a signal light pulse from a light source and a front end system comprising a continuous-time programmable transresistance amplifier converting input current through multi-scaled feedback resistors into a voltage, a digital unit, an analog-to digital converter and a digital-to-analog converter. A next step 151 illustrates calibrating said front-end system by digitally correcting each raw output of the analog-to-digital converter while the photo diode is disconnected. Step 152 depicts extracting offset for ambient light compensation. Step 153 illustrates accommodating the ambient light compensation; step 154 discloses accommodating compensated ambient light and signal light pulse and in step 155 the process flow is resumed with step 151 if the system is still ON, otherwise the process flow goes to END.

While the invention has been particularly shown and described with reference to the preferred embodiments thereof, it will be understood by those skilled in the art that various changes in form and details may be made without departing from the spirit and scope of the invention.

What is claimed is:

1. A method to accommodate a photodiode current generated by a signal light from a light source in presence of ambient light, comprising the following steps:
   (1) providing a light receiving photo diode receiving a signal light pulse from a light source and a front end system comprising a continuous-time programmable transresistance amplifier converting input current through multi-scaled feedback resistors into a voltage, a digital unit, an analog-to digital converter and a digital-to-analog converter;
   (2) calibrating said front-end system by digitally correcting each raw output of the analog-to-digital converter while the photo diode is disconnected;
   (3) extracting offset for ambient light compensation;
   (4) accommodating the ambient light compensation;
   (5) accommodating compensated ambient light and signal light pulse;
   (6) go back to step (2) if system is ON, otherwise go to step (7); and
   (7) end.

2. The method of claim 1 wherein said calibration is performed by subtracting an offset and multiplying by an appropriate correction term.

3. The method of claim 2 wherein parameters for said calibration are digitally extracted by adding two equivalent calibration currents to an input of the transresistance amplifier.

4. The method of claim 2 wherein two measurements are taken for said calibration.

5. The method of claim 1 wherein said offset extraction is performed for each a coarse loop and a fine loop of compensation branches for ambient light.

6. The method of claim 5 wherein said offset extraction for the coarse loop and for the fine loop is performed by activating different resistors of said multi-scaled feedback resistors.

7. The method of claim 1 wherein said ambient light compensation is performed by closed-loop compensation.

8. The method of claim 1 wherein said accommodation of ambient light compensation comprises a fine offset extraction, a first coarse ambient light compensation, a second coarse ambient light compensation, a first fine ambient light compensation, and a second fine ambient light compensation wherein the results of said offset extraction are used as input for the ambient light compensation and the results of the coarse ambient light compensation are used as input for the fine ambient light compensation.

9. The method of claim 8 wherein each of said accommodation steps is characterized by using a specific resistor out of said multi-scaled feedback resistors.

10. The method of claim 8 wherein the accommodation of compensated ambient light and the signal light pulse is performed by digitally subtract of measurements of the signal light pulse and of measurements of the ambient light, which are characterized as correlated double sampling.

11. The method of claim 1 wherein said signal light is an infrared light.

12. The method of claim 1 wherein the analog-to digital converter converts the output of said operational amplifier to digital values.

13. The method of claim 12 wherein said analog-to-digital converter is a sigma-delta analog-to digital converter.

14. The method of claim 13 wherein a digital cancellation logic is an integral part of the sigma-delta A/D converter, which results a fourth-order high-pass filter of the quantization noise Qn.

15. The method of claim 14 wherein said digital cancellation logic results a fourth-order high-pass filter of a quantization noise.

16. The method of claim 12 wherein large currents are digitized with larger quantization step sizes than smaller currents.

17. The method of claim 1 wherein a coarse and a fine current digital-to-analog converter in parallel are used to generate a current as an input of the transresistance amplifier compensation the ambient light.

18. The method of claim 1 wherein a calibration current source is used to correct offset of the system and gain errors.

19. The method of claim 1 wherein said digital unit is controlling the accommodation of the current generated by ambient light, selecting a range of the current generated by the signal light, and the calibration of the front end system.

20. The method of claim 1 wherein said method is used for a rain-sensing system.

21. A system to accommodate a photo diode current receiving a signal light of a sensor application in presence of ambient light having a high dynamic range comprises:
said photo diode, receiving a signal light and ambient light, generating an output current; and
a front-end circuit comprising:
a programmable means to convert said output current of the photo diode to a voltage;
a programmable means to amplify said voltage converted from the output current;
an analog-to-digital converter to convert said amplified voltage to digital values;
a first filtering means to filter the output of the analog-to-digital converter;
a second filtering means to filter the output of the first filtering means;
a digital unit receiving input from said first filtering means controlling current digital-to-analog converting means and generation of a current calibrating the system; and
said current digital-to-analog converting means to successively subtract off a current generated by ambient light at an input of said programmable means to convert said output current of the photo diode to a voltage.

22. The system of claim 21 wherein said photo diode is receiving an infrared light signal.

23. The system of claim 21 wherein said sensor application is a rain-sensing system.

24. The system of claim 21 wherein said programmable means to convert current to voltage is an operational amplifier.

25. The system of claim 24 wherein said operational amplifier is a programmable single ended continuous-time programmable transresistance amplifier.

26. The system of claim 24 wherein said operational amplifier has a number of parallel feedback resistors to achieve a high dynamic range, wherein active feedback resistors can be selected by said digital control unit.

27. The system of claim 21 wherein said feedback resistors are stepped up in 10 ratios in order to achieve a 7-decade large interval.

28. The system of claim 21 wherein said programmable means to amplify said voltage converted from the output current is a switched-capacitor programmable gain amplifier clocked by sampling frequency having a first-order low-pass corner frequency that converts a single-ended signal to fully differential.

29. The system of claim 28 wherein said sampling frequency is 4 Mhz.

30. The system of claim 28 wherein said switched-capacitor programmable gain amplifier consists of four ratios.

31. The system of claim 21 wherein said analog-to-digital converter is a switched-capacitor fourth-order oversampled sigma-delta A/D converter.

32. The system of claim 31 wherein said analog-to-digital converter is a 16× oversampled switched-capacitor fourth-order sigma-delta A/D converter.

33. The system of claim 21 wherein said sigma-delta A/D converter comprises a single-bit quantizer with differential quantization levels.

34. The system of claim 21 wherein said sigma-delta A/D converter employs a two-stage digital decimation filter that is clocked by sampling frequency of 4 MHz and provides 14-bit conversion resolution with $T_{CONV}$=32 µsec.

35. The system of claim 34 wherein a first stage of the decimation filter is fifth-order SINC filter.

36. The system of claim 35 wherein said first stage has a down-sampling ratio of 8, an output rate of 500 kHz and a impulse response of 14 µsec.

37. The system of claim 34 wherein a second stage of the decimation filters is a finite impulse response filter.

38. The system of claim 37 wherein said finite impulse response filter is a 9-tap finite impulse response filter having a rate of 500 kHz.

39. The system of claim 34 wherein a combination of said sigma-delta A/D converter and the first digital filter stage results an output rate of 500 kHz and providing an 10-bit conversion resolution with $T_{CONV}$=14 µsec.

40. The system of claim 21 wherein a digital normalization block is connected to the output of said second filtering means.

41. The system of claim 40 wherein the normalization performed by said normalization block justifies raw data received from the decimation filter according to a stored gain and offset correction values, which are calculated from biasing on two measurements at different modulation densities, carried out during system calibration.

42. The system of claim 21 wherein said current digital-to-analog converting means are a coarse 8-bit DAC and a fine 7-bit current DAC generating each a current $I_{DAC\_COARSE}$ and correspondently $I_{DAC\_FINE}$ to successively subtract off a current generated by ambient light at the input of the programmable means to convert said output current of the photo diode to a voltage before receiving a current generated by the signal light.

43. The system of claim 42 wherein said currents $I_{DAC\_COARSE}$ and correspondently $I_{DAC\_FINE}$ are generated by a constant voltage across resistors which are referred to feedback resistors of said programmable means to convert said output current of the photo diode.

44. The system of claim 21 wherein a chopping frequency is applied to the programmable means to convert said output current of the photo diode to a voltage and autozeroing to remove 1/f noise and system offset errors.

45. The system of claim 21 wherein a current source is used to remove system gain errors and residual offset errors.

46. The system of claim 21 wherein said front-end circuit is implemented using CMOS technology on one chip.

47. The system of claim 21 wherein the system is used for a measurement of the absolute visible light, which can be executed in one step for one current range.

48. The system of claim 21 wherein the system is used as a multi-purpose circuit for other measurements wherein said digital unit and said current digital-to analog converting means can be omitted and a multiplexer at the input can be added.

49. The system of claim 48 wherein the system is used to measure a feed-forward voltage of a photo diode as function of temperature.

50. The system of claim 21 wherein a shunt resistor prevents said photo diode from going into photovoltaic mode during inactive mode.

51. The system of claim 21 wherein a resistor and a capacitor in series in a feedback loop of the programmable means to convert said output current of the photo diode to a voltage are deployed to build a first-order low-pass corner frequency.

* * * * *